L. E. HICKOK.
VEHICLE GEAR.
APPLICATION FILED MAR. 29, 1913.
1,081,910.
Patented Dec. 16, 1913.
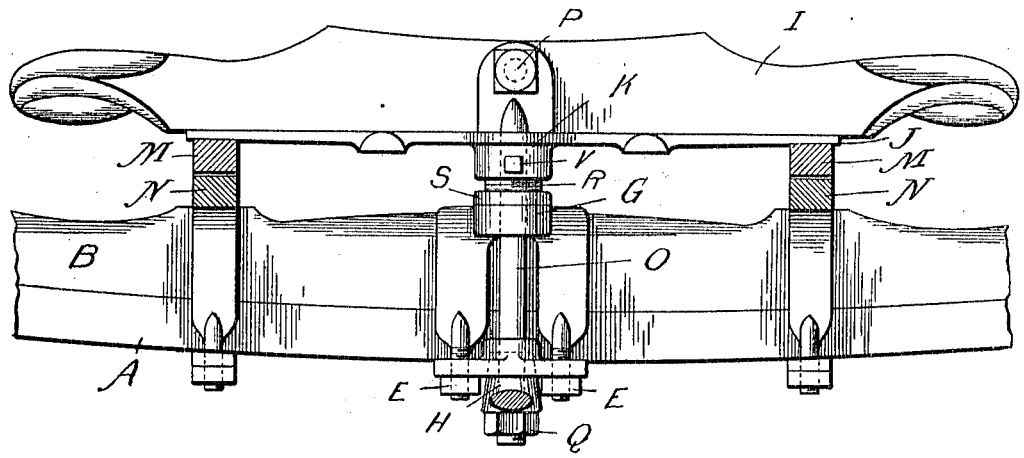
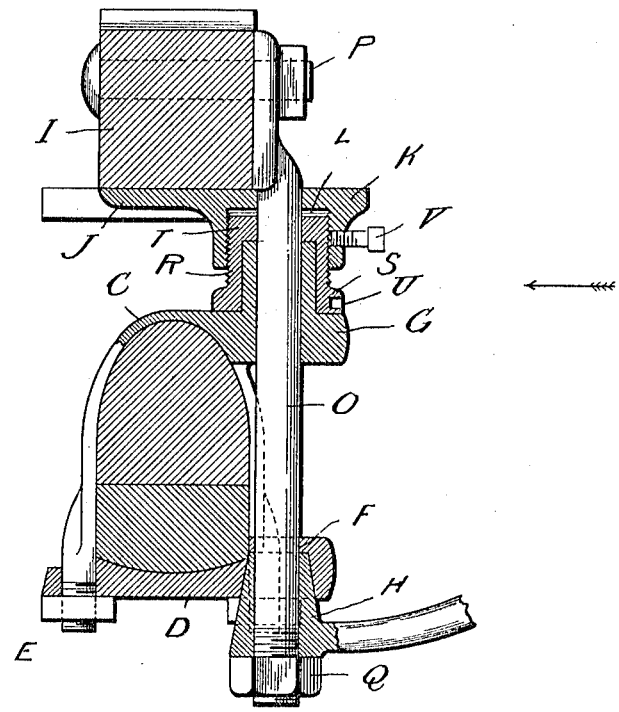
WITNESSES
INVENTOR
L. E. Hickok,
BY
F. E. Stebbins
ATTORNEY

UNITED STATES PATENT OFFICE.

LESTER E. HICKOK, OF MECHANICSBURG, PENNSYLVANIA, ASSIGNOR OF ONE-HALF TO FRANK E. WILCOX, OF MECHANICSBURG, PENNSYLVANIA.

VEHICLE-GEAR.

1,081,910.  Specification of Letters Patent.  Patented Dec. 16, 1913.

Application filed March 29, 1913. Serial No. 757,578.

*To all whom it may concern:*

Be it known that I, LESTER E. HICKOK, a citizen of the United States, residing at Mechanicsburg, in the county of Cumberland and State of Pennsylvania, have invented certain new and useful Improvements in Vehicle-Gears; and I do hereby declare the following to be a full, clear, and exact description of the invention, such as will enable others skilled in the art to which it appertains to make and use the same.

The object of my invention is the provision, generally in connection with a vehicle gear provided with a head block plate having a perforated lug, upper and lower fifth wheel members located between the head block plate and axle or axle bed, a king bolt clip with a perforated head, and a king bolt, of means for raising the head block plate and upper member of the fifth wheel so the frictional contact of the fifth wheel members will not be excessive, and so, when desired, the superimposed weight may be supported by the head of the king bolt clip, said means to be so constructed that the adjustment may be made after the parts of the gear are assembled.

In use the excessive frictional contact of the fifth wheel members prevents the easy turning of one member relative to the other, and my invention is designed to obviate this objectionable feature of operation by wholly or partially supporting the weight upon the head of the king bolt clip.

With this end in view, my invention consists in certain novelties of construction and combinations of parts as herein set forth and claimed.

The accompanying drawing illustrates an example of the embodiment of the invention constructed and combined with the head of the king bolt clip and the head block plate lug according to one of the best modes of procedure I have so far devised for the purpose.

Figure 1 is a section of a vehicle gear on a vertical plane adjacent to the king bolt showing an embodiment of the invention. Fig. 2 is a view in elevation of the entire gear, the fifth wheel members being in section, as seen when looking in the direction of the arrow, Fig. 1.

Referring to the figures, the letter A designates the axle; B, the axle bed; C, an integral three-pronged king bolt clip; D, the axle clip yoke; E, the nuts on the threaded prongs; F, a hole in the yoke for the king bolt; G, the perforated head of the king bolt clip; H, the perforated brace head; I, the head block; J, the head block plate; K, the perforated lug of the plate; L, a threaded recess at the under surface of the lug; M, the upper member of the fifth wheel secured to the head block plate; N, the lower member of the fifth wheel secured to the axle bed; O, the king bolt; P, a bolt which secures the top end of the king bolt to the head block; and Q is a nut at the lower end of the king bolt.

The means for adjustment comprises a hollow cylindrical body R having a bearing flange S at its lower end which is in frictional contact with the upper surface of the king bolt clip head or lug, a top end T located within the recess at the under surface of the head block plate lug, and the exterior being threaded and engaging threads in the perforation through the head block plate lug. Holes U may be provided in the flange S to receive a wrench or other tool for turning the cylinder, after the nut Q at the end of the king bolt has been lowered, so as to raise the head block plate and the upper fifth wheel member out of contact with the lower member or to relieve the excessive frictional contact of the two members to a degree which will permit the easy turning of the lower member relative to the upper member in the arc of a circle. A set-screw V passed through the head block plate lug may be employed to retain the cylinder R in fixed position.

Fig. 2 of the drawing shows the fifth wheel members slightly separated and the weight carried by the head of the king bolt clip which insures the easy turning of the front wheels and axle.

From the foregoing description taken in connection with the drawing it is clear that I have provided adjustable means of a very simple and effective character which can be manipulated after the parts of the gear are assembled and by the use of a wrench or analogous tool.

What I claim is:

1. The combination of a king bolt clip having a perforated head, a head block plate with a threaded perforation, a king bolt, and threaded adjustable means located between the said perforated head and the head block plate for moving and supporting the head block plate at different distances from the king bolt clip.

2. The combination of a head block plate having a threaded recess, a bearing in combination with the axle, and threaded adjustable means between the said plate and said bearing for moving and supporting the plate at different distances from the said bearing.

3. The combination of a head block having a bearing element, an axle provided with a bearing element, a king bolt, and adjustable means located between and movable independently of said bearing elements for raising the head block and supporting it at different distances from the axle.

4. The combination of a perforated and threaded head block plate, an axle clip with a perforated head, a king bolt, and a perforated and threaded element for adjusting the head block plate relative to the axle clip, the king bolt being located within the perforations of the several perforated elements.

5. The combination of a head block having a bearing element, an axle having a bearing element, one of said elements being threaded, a threaded element adapted to be bodily rotated relatively to said bearing elements to separate and support said elements at different distances from each other, and means for locking said threaded element against rotation.

6. The combination of a threaded lug K, a king bolt clip G, a threaded cylinder R, and a king bolt located within perforations in said parts, for the purpose set forth.

In testimony whereof I affix my signature, in the presence of two witnesses.

LESTER E. HICKOK.

Witnesses:
W. H. LONG,
C. M. FORREST.

Copies of this patent may be obtained for five cents each, by addressing the "Commissioner of Patents, Washington, D. C."